United States Patent Office 2,898,306
Patented Aug. 4, 1959

2,898,306

PREPARATION OF ALUMINA GELS

Robert H. Cramer, Woodbury, and Edwin E. Jenkins, Elmer, N.J., assignors to Socony Mobil Oil Company, Inc., a corporation of New York No Drawing. Application May 8, 1956
Serial No. 583,356

7 Claims. (Cl. 252—463)

This invention relates to a process for the formation of porous adsorptive inorganic oxide gels in which alumina is the major component. More particularly, the present invention is concerned with the preparation of hydrogels having a solids content consisting essentially of alumina and with the preparation of porous alumina products obtained upon removal of water from said hydrogels. In particular, the invention is directed to a commercially attractive method for the production of hydrosols and hydrogels characterized by a relatively high solids content of alumina, i.e. greater than about 10 percent by weight, which hydrogels can be subjected to subsequent wet processing operations without effecting appreciable disintegration thereof.

Various methods for producing alumina gels have heretofore been proposed. In many of the previously suggested processes for manufacturing alumina gels, extensive washing of the hydrogel is required to remove impurities in order that the final gel product will have the desired properties. Such extensive washing has been detrimental to the yield of product since a considerable amount of hydrogel ordinarily undergoes disintegration during such step. Other processes have been developed in which alumina sols are produced directly and which do not require washing of the hydrogel. Such processes include those involving reaction of water with amalgamated aluminum metal in the presence of an organic acid such as acetic acid, formic acid, and the like. In these processes, however, it is found that the solids content of the sol is so low that considerable concentration must be effected. This increases the cost of production. Thus, alumina gels containing more than about 5 percent total solids content have not been prepared commercially by the foregoing method. Such method, therefore, is not well adapted for large scale manufacture of alumina gels, since it requires the handling of extremely large quantities of dilute solutions and the drying of hydrogels of low solids content. Furthermore, this method has the disadvantages of excessive foaming and the resulting alumina hydrosol is very often contaminated by the presence of entrained metallic mercury due to peptization of the amalgamated aluminum. In addition, such hydrosols and the corresponding hydrogels produced therefrom, possessing a comparatively low solids content, have not been suitable for the production of bead-like spheroidal gel particles.

The use of alumina particles in spheroidal form offers several advantages, particularly when the alumina is employed as a catalyst or catalyst component for the conversion of petroleum hydrocarbons or as an adsorbent or a treating or refining agent. Thus, spheroidal particles permit more uniform packing in a reaction or contacting zone and thereby reduce variations in pressure drop and in channeling of reactants or fluids through only a portion of the contact bed. In addition, spheroidal particles are more resistant to attrition, particularly in moving bed processes, since there are no sharp edges to break or wear off during the necessary handling and processing.

One of the principal objects of the present invention is the provision of a process for preparing alumina hydrogels of high solids content which can be washed or otherwise subjected to wet processing, i.e. contacted with aqueous media, without undergoing appreciable disintegration. Another object is to afford a method for producing alumina hydrosols having a solids content greater than about 10 percent by weight and characterized by a short time of gelation. A still further object is the provision of a process for manufacturing alumina hydrogels in the form of spheroids of such stability that they may be washed free of water-soluble matter and dried to form hard, porous adsorbent particles.

The above and other objects which will be apparent to those skilled in the art are achieved in accordance with the present invention wherein true, all-embracing hydrogels consisting of alumina or comprising alumina as the major inorganic oxide constituent are prepared by reacting in aqueous solution a water-soluble basic aluminum salt with a water-soluble salt of a weak acid in the presence of urea to yield an alumina-containing sol which sets of an all-embracing alumina-containing hydrogel having a pH between about 3.5 and about 7, and thereafter aging the hydrogel so obtained in a hot water-immiscible medium, effecting decomposition of the urea, which serves to slowly raise the gel pH and render the hydrogel water-insoluble. The hydrogel may thereafter be contacted with such aqueous treating solutions as are desired for density control, base-exchange, impregnation, or the like, finally water-washed free of soluble matter, and dried. When the resulting alumina-containing gel is to be used as a catalyst or catalyst support, it is generally calcined at an elevated temperature between about 800° F. and about 1400° F.

It is emphasized that the present process is directed to a method for preparing true hydrogels as distinguished from gelatinous precipitates. It has heretofore been taught that the presence of a highly ionized salt in the desired alumina hydrogel forming mixture has the detrimental effect of coagulating the aluminum ions in the form of an irreversible gelatinous precipitate and not in the form of a true hydrogel. The gelatinous precipitates so produced are incapable of being formed into desired spheroidal particles by introduction thereof in a water-immiscible liquid and, further, have disadvantages of being structurally weak as compared with true hydrogels and of generally possessing a heterogeneous structure in comparison with the homogeneous structure achieved with true hydrogel formation. In accordance with the present invention, it has now been discovered that the presence in the alumina hydrogel forming mixture of a salt of a weak acid containing urea under the conditions hereinafter set forth does not serve to coagulate the reactants in the form of a gelatinous precipitate as would be expected from the prior art teachings but, on the contrary, permits the formation of a true alumina hydrogel which, after being aged in a water-immiscible medium under conditions set forth hereinbelow, can be subjected to extensive washing without undergoing disintegration.

The present invention thus contemplates an improved method for preparing hydrogels comprising alumina which, when dried, yield porous adsorptive alumina-containing gels. In order to produce alumina gels having a high solids content and capable of being subjected to subsequent wet processing operations without undergoing disintegration, it has been discovered that certain critical conditions must be observed during formation. It has been found that a stable alumina hydrogel may readily be prepared by mixing aqueous solutions of water-soluble basic aluminum salts with urea and water-soluble salts of weak acids having a strong buffering action at a 3.5 to 7 pH to yield homogeneous precipitate-free alumina hydrosols characterized by a pH within the above range and permitting the sol to set to a hydrogel. The resulting hydrogel is then contacted with a water-immiscible liquid for a sufficient time and at a sufficiently elevated temperature to decompose the urea contained therein and to raise the pH of the hydrogel to above 8 and generally within the approximate range of 8 to 11, thereby rendering said hydrogel resistant to disintegration upon subsequent contact with aqueous media.

Generally, hydrogels prepared by the process described herein are characterized by a gelation time of not more than 2 hours and a solids content of between about 10 and about 30 percent by weight, although it is to be realized that hydrogels having a longer time of set and a lesser solids content, when desired, may also be produced by the present method. The method of this invention is particularly suitable for the production of hydrogels characterized by a time of set in the range of 0.5 to 20 seconds, which hydrogels are capable of being formed into spheroidal particles upon introducing the hydrosol in the form of globules into a water-immiscible medium and maintaining the hydrosol globules in said medium until they set to globules of hydrogel.

The essential compounds required for forming alumina gel in accordance with the present process include (1) a water-soluble basic aluminum salt, (2) a water-soluble salt of a weak acid, and (3) urea. These compounds may be intimately admixed in aqueous solution in any desired manner to yield a resulting hydrosol. The solutions may be contacted by flowing streams thereof together under conditions of rapid flow, such as in a mixing nozzle. The compounds may be in the form of three individual streams or, after initially adding one of the compounds to a second, the resulting mixture may be mixed with a solution of the third compound.

The water-soluble basic aluminum salt employed may be any of the commercially available salts of this nature. These salts may be generally characterized by the formula: $[Al_a(OH)_bY_c]_x$ where Y is an acid anion, such as $Cl^-$, $NO_3^-$, $F^-$, $Br^-$, $I^-$; $a$ is a number between 1 and 10; $b$ is a number between 1 and 29; $c$ is a number between 1 and 29 and $x$ is a number between 1 and 100 and more generally between 1 and 5. The basic aluminum salts may be readily prepared by reacting metallic aluminum, water, and the requisite acid in an amount insufficient to form the normal aluminum salt. Thus, basic aluminum chloride is prepared by reacting aluminum with a deficiency of hydrochloric acid in the presence of water at an elevated temperature, for example 200–220° F. for 6–24 hours, the particular reaction time chosen depending on the state of subdivision of the aluminum metal. With very finely divided aluminum, a comparatively shorter reaction time is required than with aluminum in the form of relatively large size pieces. Basic aluminum nitrate may be prepared in similar manner, using nitric acid instead of hydrochloric acid. Basic aluminum chloride and basic aluminum nitrate are preferred for use as the water-soluble basic aluminum salt reactant in the present process. Other suitable representative compounds include basic aluminum bromide, basic aluminum iodide, and basic aluminum fluoride. It is essential that the basic aluminum salt employed be substantially or completely soluble in water at room temperature. Basic aluminum salts which are water-insoluble, for example, the basic aluminum salts of carboxylic acids, such as basic aluminum acetate, are not suitable for use in the present process. The basicity of the basic aluminum salt employed has a pronounced effect on the amount of weak acid salt required for gelation. For example, with basic aluminum chloride, if the aluminum-to-chlorine atom ratio is less than about 1.8 to 1, excessive amounts of the weak acid salt reactant are required for gelation. If the aluminum-to-chlorine atom ratio is greater than about 2.2 to 1, on the other hand, the solubility of the basic aluminum chloride in water is reduced. It is accordingly a preferred embodiment of the instant invention to utilize a water-soluble basic aluminum chloride in which the aluminum/chlorine atom ratio is between about 1.8/1 and about 2.2/1.

The water-soluble salt of weak acid used is one having a strong buffering action at a 3.5 to 7 pH and particularly over the pH range of 4 to 6. Soluble salts of weak acids, such as acetic, carbonic, lactic, oxalic, nitrous, sulfurous, and glycolic acids, may be employed. The term "weak acid" as used herein has the connotation generally understood in the art. It refers to acids having relatively low ionization constants, say, below $1 \times 10^{-1}$, as contrasted with the strong mineral acids hydrochloric, sulfuric, etc., which are substantially completely ionized except in very concentrated solutions. In general, the alkali metal, ammonium, and alkaline earth metal salts of the above-defined weak acids are considered suitable for the purposes of the invention and, of these, the alkali metal and ammonium salts are generally more suitable for use in the invention. For many purposes, ammonium salts are best because ammonia can be driven from the gel as a gas, eliminating the removal problem encountered with non-volatile salts. In those instances where it is desired to cogel with the alumina the oxides of other metals, weak acid water-soluble salts of such metals may be suitably employed. Thus, for preparing a cogel of alumina and chromia in accordance with the invention, basic aluminum chloride and chromium acetate are suitably mixed in aqueous solution with urea to give an alumina-chromia hydrosol which sets to a hydrogel of corresponding composition.

The reactant solutions of water-soluble basic aluminum salt, urea, and water-soluble salt of a weak acid are mixed in such concentration and proportion that a hydrosol in which alumina constitutes the major inorganic oxide component is formed having a pH between about 3.5 and about 7. In general, the reactants are employed in relative amounts such that the ratio of equivalents of aluminum from the water-soluble basic aluminum salt to equivalents of the acid anion of said salt is between about 5.4 and about 6.6, the equivalent ratio of weak acid salt to acid anion of the basic aluminum salt is between about 0.1 and about 5, and the equivalent ratio of urea to acid anion of the basic aluminum salt is between about 0.01 and about 10.

Without being limited by any theory, it is believed that the theoretical requirements for the formation of alumina gel in accordance with the present process are: (1) the slow ionization of the water-soluble basic aluminum salt and (2) a weak acid salt which has a strong buffering action at a pH low enough to prevent precipitation of alumina from the basic aluminum salt, i.e., a pH less than about 7. The urea does not appear to enter into the gelation reaction but is contained in the gel formed and subsequently removed therefrom by decomposition at an elevated temperature upon subsequent aging of the hydrogel, during which the hydrogel is rendered water-insoluble.

The resulting alumina hydrosol may be allowed to set to an all-embracing hydrogel in the form of a mass which is thereafter broken up or cut up into particles for wet processing. An alternate and preferred method of preparing alumina hydrogel particles is to drop the hydrosol in the form of globules into a column of water-immiscible liquid so that spheroidal bead-like particles of hydrogel are formed upon gelation of the hydrosol globules while maintained in the liquid.

Thus, in a preferred embodiment of the invention, the alumina sol is passed in finely divided form into a water-immiscible liquid maintained at substantially room temperature and retained therein until gelation occurs. The alumina sol prepared in accordance with the present process will not set instantaneously to a gelatinous mass but, on the other hand, will set to a gel within a reasonable time. This time differential may be controlled by variation in solids content of the hydrosol and by regulation of the temperature of the water-immiscible liquid into which the hydrosol is introduced. Such time differential permits passing the hydrosol into the water-immiscible liquid so that the sol may assume the desired spheroidal shape and set to a hydrogel during passage through the liquid. When the hydrosol is formed into spheroidal particles employing the above technique, the gelation time is suitably less than 20 seconds.

The solutions of basic aluminum salt, weak acid salt, and urea used in formation of the present hydrosols are preferably mixed and introduced into the water immiscible liquid at substantially room temperature. It is preferred that the water-immiscible liquid be maintained at room temperature in order to obtain gelation within the desired time. However, it will be understood that the time during which the hydrosol and resulting hydrogel remain in the water-immiscible liquid and the temperature of such liquid are correlated to obtain the desired spheroidal particles and that these conditions are inversely related so that as the temperature is increased the time may be decreased.

While the water-immiscible liquid in which gelation takes place may have a density higher than the alumina hydrogel particles, in which instance the hydrogel particles rise upwardly through the liquid, such method is ordinarily less preferred than in the case where the liquid has a lower density, allowing the hydrosol to be introduced at the top of a column thereof and the spheroidal hydrogel particles formed therein to descend to the bottom of such column. A particularly suitable water-immiscible medium comprises organic liquids, such as kerosine, gas oils, etc., of such viscosity and density characteristics that the alumina hydrosol introduced therein in the form of globules will settle at a rate such that the hydrosol sets to spheroidal particles of hydrogel during its passage through the liquid.

The alumina hydrogel spheroidal particles are thereafter removed from the water-immiscible setting liquid. It is important that the alumina particles not be contacted with water at this stage since they are water-soluble and hence subject to disintegration. The freshly formed hydrogel is brought into contact with a water-immiscible aging medium which may be either the same as the liquid in which the hydrogel was formed or other suitable water-immiscible liquid, including various organic liquids. It is particularly preferred to age the hydrogel at a temperature above about 125° F. for at least 10 hours and preferably at a temperature between about 150° F. and about 212° F. for from 15 to 48 hours in oil. During such aging treatment, urea contained in hydrogel decomposes, which slowly raises the gel pH and evolves carbon dioxide. At the end of the aging period, the hydrogel has a pH generally in the range of 8 to 11 and is water-insoluble.

In order to prevent excessive breakage of the alumina hydrogel particles during subsequent washing with water, it is ordinarily desirable to bring the previously aged particles into contact with an aqueous solution containing ammonium ions. The concentration of ammonium ions, the temperature of the treating solution containing such ions and the time of contact between the hydrogel and ammonium treating solution are interrelated variables. Generally, an ammonium salt, such as ammonium chloride, ammonium nitrate, ammonium acetate, ammonium sulfate, and the like, or ammonium hydroxide solution will be used, having a concentration of 1 to 10 percent by weight. An ammonium hydroxide solution containing about 5 percent by weight ammonia has been found to be particularly feasible. The temperature of the ammonium treating solution is desirably room temperature, although elevated temperatures up to about 212° F. may be used. The time of contact is generally at least 10 hours and may extend up to 48 hours or longer. Using an ammonium hydroxide solution of about 5 percent by weight ammonia and carrying out the treatment at about room temperature, a contact time of about 24 hours has been found to be effective in affording an alumina gel product characterized by high resistance to breakage during subsequent water washing.

After the aging treatment in water-immiscible liquid to render the hydrogel water-insoluble and the treatment in ammonium ion solution, if carried out, the hydrogel particles are water-washed free of soluble matter. A particularly satisfactory method for washing the hydrogel is by percolation, either with upward or downward flow of water and preferably with water containing a small amount of ammonium hydroxide or ammonium nitrate. After washing, the hydrogel particles are dried at a temperature generally from about 200° F. to about 350° F for 2 to 24 hours or more or dried at such temperature and then calcined at a temperature of from about 350° F. to about 1400° F. for 2 to 12 hours or more. Generally, it is preferred to dry the hydrogel particles in air or an atmosphere of superheated steam at a slow rate since such manner of operation has been found to result in less breakage of the gel particles. Calcination is ordinarily carried out in air, although other inert atmospheres may likewise be used. The particular temperature chosen for calcination will depend, in part, on the use to be made of the finished gel. Thus, where the gel is to be employed as an adsorbent, it is calcined at a temperature in the approximate range of 350° F. to 800° F. If, on the other hand, the gel is to be used as a catalyst or catalyst support, the temperature of calcination is generally between about 800° F. and about 1400° F. If desired, the alumina hydrogel particles may be treated with catalytic components prior to the drying or drying and calcining operations and the composite so obtained may then be subjected to the above-described drying and calcining.

The following examples will serve to illustrate the process of the invention without limiting the same:

*Example 1*

An alumina hydrogel was prepared from the following reactants:

*Solution A.*—Water solution of basic aluminum chloride having a specific gravity at 60° F. of 1.320 and containing on a weight basis 21.9% alumina and 7.6% chlorine.

*Solution B.*—Water solution having a specific gravity at 60° F. of 1.205 and containing by weight 26.8% sodium acetate and 19.7% urea.

Solution A, flowing at a rate of 370 cc./min. was mixed in a nozzle with Solution B, flowing at a rate of 148 cc./min. The hydrosol so formed, having a concentration of 206 grams $Al_2O_3$ per liter was introduced into the top of a column of oil as a finely divided stream. The hydrosol so introduced assumed globular form and set in about 4 seconds at a temperature of 70° F. to spheroidal particles of hydrogel during passage through the oil column. The resulting hydrogel was hard and clear and had a pH of 6.2.

The hydrogel particles so obtained were aged in a petroleum oil for 36 hours at 200° F. The aged hydrogel particles, having a pH of approximately 10 were then treated for 24 hours with an aqueous solution of ammonium hydroxide containing about 5 percent by weight of ammonia. The pH of the hydrogel after this treatment was 11.7. The hydrogel particles were thereafter washed with water containing a small amount (approximately 0.03%) of ammonia to remove water-soluble impurities. The hydrogel did not undergo any disintegration during the foregoing wet processing steps. The hydrogel particles were then dried in superheated steam for 5 hours at 230° F. and for ½ hour more at 340° F. The dried particles were thereafter calcined in air for 3 hours at 1240° F. The final alumina gel product in the form of hard spheroids had a density of 0.37 gram per cubic centimeter.

It is essential to the success of the process described herein that urea be present in the formed hydrosol. If urea is omitted therefrom, the hydrogel obtained is not water-insoluble but, on the contrary, undergoes complete disintegration during wet processing as will be evident from the following:

*Example 2*

An alumina hydrogel was prepared from the following reactants:

Solution A.—Water solution of basic aluminum chloride having a specific gravity at 60° F. of 1.349 and containing on a weight basis 23.5% alumina and 8.15% chlorine.

Solution B—Water solution having a specific gravity at 60° F. of 1.176 and containing by weight 33.3% sodium acetate.

Solution A, flowing at a rate of 800 cc./min. was mixed in a nozzle with Solution B, flowing at a rate of 320 cc./min. The hydrosol so formed, having a concentration of 227 grams $Al_2O_3$ per liter was introduced into the top of a column of oil as a finely divided stream. The hydrosol introduced assumed globular form and set in about 4 seconds at a temperature of 108° F. to spheroidal particles of hydrogel during passage through the oil column. The resulting hydrogel had a pH of 5.5.

The hydrogel particles so obtained were aged in a petroleum oil for 24 hours at 200° F. and thereafter treated for 24 hours with an aqueous solution of ammonium hydroxide containing about 5 percent by weight of ammonia. The pH of the hydrogel after this treatment was 11.7. The hydrogel particles were thereafter washed with water containing a small amount of ammonia (approximately 0.03%) to remove water-soluble impurities. At the completion of the above wet processing steps, it was found that the spheroidal hydrogel particles initially obtained had been completely disintegrated to a mush.

The following example shows the use of a solution of ammonium acetate in treatment of the aged hydrogel:

*Example 3*

An alumina hydrogel was prepared from the following reactants:

Solution A.—Water solution of basic aluminum chloride having a specific gravity at 60° F. of 1.321 and containing on a weight basis 22.8% alumina and 7.75% chlorine.

Solution B.—Water solution having a specific gravity at 60° F. of 1.217 and containing by weight 24.3% sodium acetate and 26.9% urea.

Solution A, flowing at a rate of 372 cc./min. was mixed in a nozzle with Solution B, flowing at a rate of 148 cc./min. The hydrosol so formed, having a concentration of 215 grams $Al_2O_3$ per liter was introduced into the top of a column of oil as a finely divided stream. The hydrosol so introduced assumed globular form and set in about 6 seconds at a temperature of about 100° F. to spheroidal particles of hydrogel during passage through the oil column. The resulting hydrogel was hard and firm and had a pH of 5.0.

The hydrogel particles so obtained were aged in a petroleum oil for 36 hours at 210° F. The aged hydrogel particles, having a pH of 8.9 were then treated with a 5% aqueous solution of ammonium acetate. The gel particles were thereafter waterwashed for 38 hours until free of soluble matter. The hydrogel did not undergo any disintegration during the foregoing wet processing steps. The hydrogel particles were then dried in superheated steam for 5 hours at 230° F. and for ½ hour more at 340° F. The dried particles were thereafter calcined in air for 3 hours at 1000° F. The final alumina gel product in the form of hard spheroids had a density of 0.76 gram per cubic centimeter and a surface area of 181 square meters per gram.

The following example illustrates the use of basic aluminum nitrate as the water-soluble basic aluminum salt reactant:

*Example 4*

An alumina hydrogel was prepared from the following reactants:

Solution A.—Water solution of basic aluminum nitrate having a specific gravity at 60° F. of 1.300 and containing on a weight basis 18.1% alumina and 10.2% $NO_3^-$.

Solution B.—Water solution having a specific gravity at 60° F. of 1.202 and containing by weight 22.5% sodium acetate and 25.0% urea.

Solution A, flowing at a rate of 500 cc./min. was mixed in a nozzle with Solution B, flowing at a rate of 307 cc./min. The hydrosol so formed, having a concentration of 147 grams $Al_2O_3$ per liter was poured into a tray and set therein at a temperature of 120° F. to a hydrogel in 10 minutes. The resulting hydrogel was hard and clear and had a pH of 5.4.

The hydrogel so obtained was cut into cubes and aged in a petroleum oil for 36 hours at 210° F. The aged hydrogel cubes, having a pH of 8.9 were then treated with a 5% aqueous solution of ammonia. The pH of the hydrogel after this treatment was 8.5. The hydrogel particles were then washed free of soluble matter with water containing a small quantity of ammonia. The hydrogel cubes did not undergo any disintegration during the foregoing wet processing steps. The hydrogel particles were then dried in superheated steam for 5 hours at 230° F. and for ½ hour more at 340° F. The resultant dried cubes of alumina gel had a density of 0.29 gram per cubic centimeter.

The following example will serve to illustrate the use in the reactant solutions of two salts of weak acids:

*Example 5*

An alumina hydrogel was prepared from the following reactants:

Solution A.—Water solution of basic aluminum chloride having a specific gravity at 60° F. of 1.321 and containing on a weight basis 22.7% alumina and 7.75% chlorine.

Solution B.—Water solution having a specific gravity at 60° F. of 1.211 and containing by weight 26.7% sodium acetate, 15.4% ammonium glycolate, and 17.8% urea.

Solution A, flowing at a rate of 500 cc./min. was mixed in a nozzle with Solution B, flowing at a rate of 213 cc./min. The hydrosol so formed, having a concentration of 210 grams $Al_2O_3$ per liter was poured into a tray and set therein at room temperature to a hydrogel in about 1 hour. The resulting hydrogel was hard and had a pH of 5.3.

The hydrogel so obtained was cut into cubes and aged in a petroleum oil for 36 hours at 210° F. The aged hydrogel cubes were then treated at room temperature with a 5 percent aqueous solution of ammonia. The pH of the hydrogel after this treatment was 8.9. The hydrogel particles were then washed free of soluble matter with water containing a small quantity of ammonia. The hydrogel did not undergo disintegration during the above wet processing operations. The hydrogel particles were then dried in superheated steam for 11½ hours at 230° F. and for ½ hour more at 340° F. The resultant dried cubes of alumina gel had a density of 0.77 gram per cubic centimeter.

It is contemplated that the alumina gel produced in accordance with the process of this invention may be used as desiccants, adsorbents, treating, refining, or purifying agents, or as a catalyst support, catalyst or component of a catalyst for the conversion of organic compounds and particularly the conversion of hydrocarbons. Thus, alumina is of particular value in the manufacture of petroleum cracking catalyst and petroleum hydroforming catalyst. In the manufacture of impregnated alumina hydroforming catalysts, it is common practice to include in the alumina gel one or more polyvalent metal oxides, usually an oxide of the 5th, 6th, and 8th groups of the periodic system. Thus, for example, a hydroforming catalyst may be prepared by incorporating a minor proportion, for example, 2–15 percent by weight, of molybdenum oxide on the washed alumina hydrogel prior to drying and calcining thereof. Chromium oxide in amounts ranging from about 2 percent to about 30 percent of the finished catalyst may also be used. Other oxides, such as those of tungsten, vanadium, platinum, palladium, osmium, iridium, ruthenium, or rhodium may be employed. Also, the alumina gel may be combined with cobalt molybdate or two or more metal oxides, for example, chromia and molybdena. Any one or more of these or other similar metal oxides can be incorporated in the hydrosol, hydrogel or impregnated on the finished alumina gel. Such catalysts are particularly valuable in the form of hard, glassy spheroids since they are thereby rendered more resistant to abrasion and hence are well adapted to either static or moving bed type systems wherein the catalyst moves in a closed path including a reactor and a regenerator.

Other than its use for catalytic and contact purposes described above, the alumina product prepared as described herein may be employed as a mordant in dyeing operations, in compounding synthetic rubber where the alumina may be added as a whitening component or as a filler for rubber, in the preparation of pigments for paints, in the formulation of pharmaceuticals and in cosmetic preparations as well as in many other applications where a highly porous, low density or catalytically active form of alumina is desired.

It is to be understood that the above description is merely illustrative of preferred embodiments of the invention, of which many variations may be made by those skilled in the art without departing from the spirit thereof.

We claim:

1. A process for formation of alumina-containing gels comprising reacting in aqueous solution a water-soluble basic aluminum salt selected from the group consisting of basic aluminum chloride and basic aluminum nitrate, urea, and a water-soluble salt selected from the group consisting of ammonium and alkali metal salts of acetic and glycolic acids to effect formation of a homogeneous hydrosol in which alumina is the major water-insoluble inorganic oxide component and which has a pH between about 3.5 and about 7, permitting said hydrosol to set to an all-embracing alumina-containing hydrogel, aging the resulting hydrogel in a water-immiscible liquid at a temperature between about 125° F. and about 212° F. for at least 10 hours to slowly decompose the urea contained therein and to raise the pH of the hydrogel to a value above about 8, whereby the hydrogel is rendered resistant to disintegration upon contacting with aqueous media, washing the aged hydrogel free of water-soluble matter, and drying.

2. A process for formation of alumina-containing gels comprising reacting in aqueous solution a water-soluble basic aluminum salt selected from the group consisting of basic aluminum chloride and basic aluminum nitrate, urea, and a water-soluble salt selected from the group consisting of ammonium and alkali metal salts of acetic and glycolic acids to effect formation of a homogeneous hydrosol in which alumina is the major water-insoluble inorganic oxide component and which has a pH between about 3.5 and about 7, permitting said hydrosol to set to an alumina-containing hydrogel, aging the resulting hydrogel in a water-immiscible liquid at a temperature between about 150° F. and about 212° F. for about 15 to about 48 hours to effect slow decomposition of the urea contained therein and to raise the pH of the hydrogel to a value greater than about 8, whereby the hydrogel is rendered resistant to disintegration upon contacting with aqueous media, contacting the aged hydrogel with an ammonium ion-containing solution for at least 10 hours, thereafter washing the hydrogel free of water-soluble matter, drying the washed hydrogel, and calcining the dried gel.

3. A process for producing an alumina gel, which comprises reacting in aqueous solution a water-soluble basic aluminum salt selected from the group consisting of basic aluminum chloride and basic aluminum nitrate, urea, and a water-soluble salt selected from the group consisting of ammonium and alkali metal salts of acetic and glycolic acids to effect formation of a homogeneous alumina hydrosol having a pH between about 3.5 and about 7, permitting said hydrosol to set to an alumina hydrogel, aging the resulting hydrogel in a water-immiscible liquid at a temperature between about 150° F. and about 212° F. for about 15 to about 48 hours to slowly decompose the urea contained therein and to raise the pH of the hydrogel to a value greater than about 8, whereby the hydrogel is rendered resistant to disintegration upon contacting with aqueous media, treating the aged hydrogel for at least about 10 hours with an aqueous solution containing between about 1 and about 10 percent by weight of an ammonium compound selected from the group consisting of ammonium hydroxide and an ammonium salt, washing the treated hydrogel free of water-soluble matter, drying the washed hydrogel, and calcining the dried gel.

4. A process for formation of alumina-containing gels comprising reacting in aqueous solution a water-soluble basic aluminum chloride in which the atom ratio of aluminum to chlorine is between about 1.8/1 to about 2.2/1, urea, and a water-soluble salt selected from the group consisting of ammonium and alkali metal salts of acetic and glycolic acids to effect formation of a homogeneous hydrosol in which alumina is the major water-insoluble inorganic oxide component and which has a pH between about 3.5 and about 7, permitting said hydrosol to set to an alumina-containing hydrogel, aging the resulting hydrogel in oil at a temperature between about 150° F. and about 212° F. for about 15 to about 48 hours to slowly decompose the urea contained therein and to raise the pH of the hydrogel to a value greater than about 8, whereby the hydrogel is rendered resistant to disintegration upon contacting with aqueous media, washing the aged hydrogel free of water-soluble matter, and drying.

5. A process for producing an alumina gel comprising reacting in aqueous solution a basic aluminum salt selected from the group consisting of basic aluminum chloride and basic aluminum nitrate, urea, and sodium acetate to effect formation of a homogeneous alumina hydrosol having a pH between about 3.5 and about 7, permitting said hydrosol to set to an all-embracing alumina hydrogel, aging the resulting hydrogel in a water-immiscible liquid at a temperature between about 150° F. and about 212° F. for about 15 to about 48 hours to slowly decompose the urea contained therein and to raise the pH of the hydrogel to a value above about 8, whereby the hydrogel is rendered resistant to disintegration upon contacting with aqueous media, washing the aged hydrogel free of water-soluble matter, drying the aged hydrosol, and calcining the dried gel.

6. A process for forming spheroidal particles of alumina-containing gel comprising reacting in aqueous solution a water-soluble basic aluminum salt selected from the group consisting of basic aluminum chloride and basic aluminum nitrate, urea, and a water-soluble salt selected from the group consisting of ammonium and alkali metal salts of acetic and glycolic acids to effect formation of a homogeneous hydrosol in which alumina is the major water-insoluble inorganic oxide component, which has a time of gelation of less than about 20 seconds and which has a pH of about 3.5 and about 7, introducing said hydrosol as a finely divided stream into a column of water-immiscible medium wherein the hydrosol sets to globules of hydrogel during passage through said column, aging the resulting particles of hydrogel in oil at a temperature between about 150° F. and about 212° F. for about 15 to about 48 hours to effect slow decomposition of the urea contained therein and to raise the pH of the hydrogel particles to a value greater than 8, whereby the particles are rendered resistant to disintegration upon contacting with aqueous media, washing the aged hydrogel particles free of water-soluble matter, drying the washed hydrogel particles, and calcining the dried spheroidal gel particles.

7. A process for producing spheroidal alumina gel particles, which comprises reacting in aqueous solution a water-soluble basic aluminum salt selected from the group consisting of basic aluminum chloride and basic aluminum nitrate, urea, and a water-soluble salt selected from the group consisting of ammonium and alkali metal salts of acetic and glycolic acids to effect formation of a homogeneous alumina hydrosol having a time of gelation of less than 20 seconds and a pH between about 3.5 and about 7, introducing said hydrosol as a finely divided stream into a column of water-immiscible medium wherein the hydrosol sets to globules of hydrogel during passage through said column, aging the resulting hydrogel particles in a water-immiscible liquid at a temperature between about 125° F. and about 212° F. for at least 10 hours to slowly decompose the urea contained therein and to raise the pH of the hydrogel particles to a value greater than about 8, whereby the particles are rendered resistant to disintegration upon contacting with aqueous media, treating the aged hydrogel particles for at least about 10 hours with an aqueous solution containing between about 1 and about 10 percent by weight of an ammonium compound selected from the group consisting of ammonium hydroxide and an ammonium salt, washing the treated hydrogel particles free of water-soluble matter, drying the washed hydrogel particles, and calcining the dried alumina gel particles.

References Cited in the file of this patent

UNITED STATES PATENTS

| | | |
|---|---|---|
| 485,461 | Dewey | Nov. 1, 1892 |
| 1,830,705 | Marx et al. | Nov. 3, 1931 |
| 2,137,638 | Sondern et al. | Nov. 22, 1938 |
| 2,400,709 | Patrick | May 21, 1946 |
| 2,422,499 | Pierce et al. | June 17, 1947 |
| 2,492,167 | Marisic et al. | Dec. 27, 1949 |
| 2,623,860 | Haensel | Dec. 30, 1952 |
| 2,689,226 | Hoekstra | Sept. 14, 1954 |